US007151802B1

(12) United States Patent
Bessette et al.

(10) Patent No.: US 7,151,802 B1
(45) Date of Patent: Dec. 19, 2006

(54) HIGH FREQUENCY CONTENT RECOVERING METHOD AND DEVICE FOR OVER-SAMPLED SYNTHESIZED WIDEBAND SIGNAL

(75) Inventors: Bruno Bessette, Rock Forest (CA); Redwan Salami, Sherbrooke (CA); Roch Lefebvre, Canton de Magog (CA)

(73) Assignee: Voiceage Corporation, Quebec (CA)

( * ) Notice: Subject to any disclaimer, the term of this patent is extended or adjusted under 35 U.S.C. 154(b) by 0 days.

(21) Appl. No.: 09/830,332

(22) PCT Filed: Oct. 27, 1999

(86) PCT No.: PCT/CA99/00990

§ 371 (c)(1),
(2), (4) Date: Jul. 23, 2001

(87) PCT Pub. No.: WO00/25305

PCT Pub. Date: May 4, 2000

(30) Foreign Application Priority Data

Oct. 27, 1998 (CA) .................................... 2252170

(51) Int. Cl.
*H04L 27/00* (2006.01)
*G10L 19/02* (2006.01)
*G10L 11/04* (2006.01)

(52) U.S. Cl. ....................... 375/259; 704/203; 704/207

(58) Field of Classification Search ................ 375/259; 455/65; 704/202, 203–207
See application file for complete search history.

(56) References Cited

U.S. PATENT DOCUMENTS 5,113,262 A * 5/1992 Strolle et al. ................. 386/27
5,235,669 A * 8/1993 Ordentlich et al. ......... 704/200

(Continued)

FOREIGN PATENT DOCUMENTS

EP 0545386 A2 6/1993
EP 0838804 A2 4/1998

(Continued)

OTHER PUBLICATIONS

Holger Carl and Ulrich Heute, "Bandwidth Enhancement of Narrow-Band Speech Signals," *Signal Processing VII: Theories and Applications*, vol. II, pp. 1178-1181.

(Continued)

*Primary Examiner*—Khai Tran
*Assistant Examiner*—Cicely Ware
(74) *Attorney, Agent, or Firm*—Darby & Darby

(57) ABSTRACT

In a method and device for recovering the high frequency content of a wideband signal previously down-sampled, and for injecting this high frequency content in an over-sampled synthesized version of the wideband signal to produce a fill-spectrum synthesized wideband signal, a random noise generator produces a noise sequence having a given spectrum. A spectral shaping unit spectrally shapes the noise sequence in relation to linear prediction filter coefficients related to the down-sampled wideband signal. A signal injection circuit finally injects the spectrally-shaped noise sequence in the over-sampled synthesized signal version to thereby produce the full-spectrum synthesized wideband signal.

54 Claims, 4 Drawing Sheets

U.S. PATENT DOCUMENTS

| | | | | | |
|---|---|---|---|---|---|
| 5,394,473 | A | * | 2/1995 | Davidson | 704/200.1 |
| 5,444,816 | A | | 8/1995 | Adoul et al. | 395/2.28 |
| 5,455,888 | A | * | 10/1995 | Iyengar et al. | 704/203 |
| 5,581,652 | A | * | 12/1996 | Abe et al. | 704/222 |
| 5,699,482 | A | | 12/1997 | Adoul et al. | 395/2.28 |
| 5,701,392 | A | | 12/1997 | Adoul et al. | 395/2.28 |
| 5,754,976 | A | | 5/1998 | Adoul et al. | 704/223 |
| 5,956,624 | A | * | 9/1999 | Hunsinger et al. | 455/65 |
| 5,978,759 | A | | 11/1999 | Tsushima et al. | |
| 5,999,897 | A | * | 12/1999 | Yeldener | 704/207 |
| 6,134,373 | A | * | 10/2000 | Strolle et al. | 386/9 |

FOREIGN PATENT DOCUMENTS

| | | |
|---|---|---|
| JP | 08-123495 | 5/1996 |
| JP | 08-248997 | 9/1996 |

OTHER PUBLICATIONS

Yan Ming Cheng et al., "Statistical Recovery of Wideband Speech from Narrowband Speech," *IEEE Transactions on Speech and Audio Processing,* vol. 2, No. 4, pp. 544-548.

* cited by examiner

HIGH FREQUENCY CONTENT RECOVERING METHOD AND DEVICE FOR OVER-SAMPLED SYNTHESIZED WIDEBAND SIGNAL

BACKGROUND OF THE INVENTION

1. Field of the Invention

The present invention relates to a method and device for recovering a high frequency content of a wideband signal previously down-sampled, and for injecting this high frequency content in an over-sampled synthesized version of the down-sampled wideband signal to produce a full-spectrum synthesized wideband signal.

2. Brief Description of the Prior Art

The demand for efficient digital wideband speech/audio encoding techniques with a good subjective quality/bit rate trade-off is increasing for numerous applications such as audio/video teleconferencing, multimedia, and wireless applications, as well as Internet and packet network applications. Until recently, telephone bandwidths filtered in the range 200–3400 Hz were mainly used in speech coding applications. However, there is an increasing demand for wideband speech applications in order to increase the intelligibility and naturalness of the speech signals. A bandwidth in the range 50–7000 Hz was found sufficient for delivering a face-to-face speech quality. For audio signals, this range gives an acceptable audio quality, but still lower than the CD quality which operates on the range 20–20000 Hz.

A speech encoder converts a speech signal into a digital bitstream which is transmitted over a communication channel (or stored in a storage medium). The speech signal is digitized (sampled and quantized with usually 16-bits per sample) and the speech encoder has the role of representing these digital samples with a smaller number of bits while maintaining a good subjective speech quality. The speech decoder or synthesizer operates on the transmitted or stored bit stream and converts it back to a sound signal.

One of the best prior art techniques capable of achieving a good quality/bit rate trade-off is the so-called Code Excited Linear Prediction (CELP) technique. According to this technique, the sampled speech signal is processed in successive blocks of L samples usually called frames where L is some predetermined number (corresponding to 10–30 ms of speech). In CELP, a linear prediction (LP) synthesis filter is computed and transmitted every frame. The L-sample frame is then divided into smaller blocks called subframes of size of N samples, where L=kN and k is the number of subframes in a frame (N usually corresponds to 4–10 ms of speech). An excitation signal is determined in each subframe, which usually consists of two components: one from the past excitation (also called pitch contribution or adaptive codebook) and the other from an innovative codebook (also called fixed codebook). This excitation signal is transmitted and used at the decoder as the input of the LP synthesis filter in order to obtain the synthesized speech.

An innovative codebook in the CELP context, is an indexed set of N-sample-long sequences which will be referred to as N-dimensional codevectors. Each codebook sequence is indexed by an integer k ranging from 1 to M where M represents the size of the codebook often expressed as a number of bits b, where $M=2^b$.

To synthesize speech according to the CELP technique, each block of N samples is synthesized by filtering an appropriate codevector from a codebook through time varying filters modeling the spectral characteristics of the speech signal. At the encoder end, the synthesis output is computed for all, or a subset, of the codevectors from the codebook (codebook search). The retained codevector is the one producing the synthesis output closest to the original speech signal according to a perceptually weighted distortion measure. This perceptual weighting is performed using a so-called perceptual weighting filter, which is usually derived from the LP synthesis filter.

The CELP model has been very successful in encoding telephone band sound signals, and several CELP-based standards exist in a wide range of applications, especially in digital cellular applications. In the telephone band, the sound signal is band-limited to 200–3400 Hz and sampled at 8000 samples/sec. In wideband speech/audio applications, the sound signal is band-limited to 50–7000 Hz and sampled at 16000 samples/sec.

Some difficulties arise when applying the telephone-band optimized CELP model to wideband signals, and additional features need to be added to the model in order to obtain high quality wideband signals. Wideband signals exhibit a much wider dynamic range compared to telephone-band signals, which results in precision problems when a fixed-point implementation of the algorithm is required (which is essential in wireless applications). Further, the CELP model will often spend most of its encoding bits on the low-frequency region, which usually has higher energy contents, resulting in a low-pass output signal. To overcome this problem, the perceptual weighting filter has to be modified in order to suit wideband signals, and pre-emphasis techniques which boost the high frequency regions become important to reduce the dynamic range, yielding a simpler fixed-point implementation, and to ensure a better encoding of the higher frequency contents of the signal. Further, the pitch contents in the spectrum of voiced segments in wideband signals do not extend over the whole spectrum range, and the amount of voicing shows more variation compared to narrow-band signals. Thus, it is important to improve the closed-loop pitch analysis to better accommodate the variations in the voicing level.

Some difficulties arise when applying the telephone-band optimized CELP model to wideband signals, and additional features need to be added to the model in order to obtain high quality wideband signals.

As an example, in order to improve the coding efficiency and reduce the algorithmic complexity of the wideband encoding algorithm, the input wideband signal is down-sampled from 16 kHz to around 12.8 kHz. This reduces the number of samples in a frame, the processing time and the signal bandwidth below 7000 Hz to thereby enable reduction in bit rate down to 12 kbit/s while keeping very high quality decoded sound signal. The complexity is also reduced due to the lower number of samples per speech frame. At the decoder, the high frequency contents of the signal needs to be reintroduced to remove the low pass filtering effect from the decoded synthesized signal and retrieve the natural sounding quality of wideband signals. For that purpose, an efficient technique for recovering the high frequency content of the wideband signal is needed to thereby produce a full-spectrum wideband synthesized signal, while maintaining a quality close to the original signal.

OBJECT OF THE INVENTION

An object of the present invention is therefore to provide such an efficient high frequency content recovery technique.

SUMMARY OF THE INVENTION

More specifically, in accordance with the present invention, there is provided a method for recovering a high frequency content of a wideband signal previously down-sampled and for injecting the high frequency content in an over-sampled synthesized version of the wideband signal to produce a full-spectrum synthesized wideband signal. This high-frequency content recovering method comprises: generating a noise sequence; spectrally-shaping the noise sequence in relation to shaping parameters representative of the down-sampled wideband signal; and injecting the spectrally-shaped noise sequence in the over-sampled synthesized signal version to thereby produce the full-spectrum synthesized wideband signal.

The present invention further relates to a device for recovering a high frequency content of a wideband signal previously down-sampled and for injecting this high frequency content in an over-sampled synthesized version of the wideband signal to produce a full-spectrum synthesized wideband signal. This high-frequency content recovering device comprises a noise generator for producing a noise sequence, a spectral shaping unit for shaping the noise sequence in relation to shaping parameters representative of the down-sampled wideband signal, and a signal injection circuit for injecting the spectrally-shaped noise sequence in the over-sampled synthesized signal version to thereby produce the full-spectrum synthesized wideband signal.

In accordance with a preferred embodiment, the noise sequence is a white noise sequence.

Preferably, spectral shaping of the noise sequence comprises: producing a scaled white noise sequence in response to the white noise sequence and a first subset of the shaping parameters; filtering the scaled white noise sequence in relation to a second subset of the shaping parameters comprising bandwidth expanded synthesis filter coefficients to produce a filtered scaled white noise sequence characterized by a frequency bandwidth generally higher than a frequency bandwidth of the over-sampled synthesized signal version; and band-pass filtering the filtered scaled white noise sequence to produce a band-pass filtered scaled white noise sequence to be subsequently injected in the over-sampled synthesized signal version as the spectrally-shaped white noise sequence.

Still according to the present invention, there is provided a decoder for producing a synthesized wideband signal, comprising:

a) a signal fragmenting device for receiving an encoded version of a wideband signal previously down-sampled during encoding and extracting from the encoded wideband signal version at least pitch codebook parameters, innovative codebook parameters, and synthesis filter coefficients;

b) a pitch codebook responsive to the pitch codebook parameters for producing a pitch codevector;

c) an innovative codebook responsive to the innovative codebook parameters for producing an innovative codevector;

d) a combiner circuit for combining the pitch codevector and the innovative codevector to thereby produce an excitation signal;

e) a signal synthesis device including a synthesis filter for filtering the excitation signal in relation to the synthesis filter coefficients to thereby produce a synthesized wideband signal, and an oversampler responsive to the synthesized wideband signal for producing an over-sampled signal version of the synthesized wideband signal; and f) a high-frequency content recovering device as described hereinabove, for recovering a high frequency content of the wideband signal and for injecting the high frequency content in the over-sampled signal version to produce the full-spectrum synthesized wideband signal.

In accordance with a preferred embodiment, the decoder further comprises:

a) a voicing factor generator responsive to the adaptive and innovative codevectors for calculating a voicing factor for forwarding to the gain adjustment module;

b) an energy computing module responsive to the excitation signal for calculating an excitation energy for forwarding to the gain adjustment module; and c) a spectral tilt calculator responsive to the synthesized signal for calculating a tilt scaling factor for forwarding to the gain adjustment module. The first subset of the shaping parameters comprises the voicing factor, the energy scaling factor, and the tilt scaling factor, and the second subset of the shaping parameters includes linear prediction coefficients.

In accordance with other preferred embodiments of the decoder:

the voicing factor generator calculates the voicing factor $r_v$ using the relation:

$$r_v=(E_v-E_c)/(E_v+E_c)$$

where $E_v$ is the energy of the gain scaled pitch codevector and $E_c$ is the energy of the gain scaled innovative codevector;

the gain adjusting unit calculates an energy scaling factor using the relation:

$$\text{Energy scaling factor} = \sqrt{\frac{\sum_{n=0}^{N-1} u'^2(n)}{\sum_{n=0}^{N'-1} w'^2(n)}},$$

n=0, . . . , N'−1.

where w' is the white noise sequence and u' is an enhanced excitation signal derived from the excitation signal;

the spectral tilt calculator calculates the tilt scaling factor $g_t$ using the relation:

$$g_t=1-\text{tilt bounded by } 0.2 \leqq g_t \leqq 1.0$$

where $$\text{tilt} = \frac{\sum_{n=1}^{N-1} s_h(n)s_h(n-1)}{\sum_{n=0}^{N-1} s_h^2(n)},$$

conditioned by tilt≧0 and tilt≧$r_v$.

or the relation:

$$g_t=10^{-0.6\,tilt} \text{ bounded by } 0.2 \leqq g_t \leqq 1.0$$

where $$\text{tilt} = \frac{\sum_{n=1}^{N-1} s_h(n)s_h(n-1)}{\sum_{n=0}^{N-1} s_h^2(n)},$$

conditioned by tilt≧0 and tilt≧$r_v$.

Preferably, the band-pass filter has a frequency bandwidth located between 5.6 kHz and 7.2 kHz.

Also according to the present invention, in a decoder for producing a synthesized wideband signal, comprising:

a) a signal fragmenting device for receiving an encoded version of a wideband signal previously down-sampled during encoding and extracting from the encoded wideband signal version at least pitch codebook parameters, innovative codebook parameters, and synthesis filter coefficients;

b) a pitch codebook responsive to the pitch codebook parameters for producing a pitch codevector;

c) an innovative codebook responsive to the innovative codebook parameters for producing an innovative codevector;

d) a combiner circuit for combining the pitch codevector and the innovative codevector to thereby produce an excitation signal; and e) a signal synthesis device including a synthesis filter for filtering the excitation signal in relation to the synthesis filter coefficients to thereby produce a synthesized wideband signal, and an oversampler responsive to the synthesized wideband signal for producing an over-sampled signal version of the synthesized wideband signal;

the improvement comprising a high-frequency content recovering device as described hereinabove for recovering a high frequency content of the wideband signal and for injecting the high frequency content in the over-sampled signal version to produce the full-spectrum synthesized wideband signal.

The present invention finally comprises a cellular communication system, a cellular mobile transmitter/receiver unit, a cellular network element, and a bidirectional wireless communication sub-system comprising the above described decoder.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Figure 4:
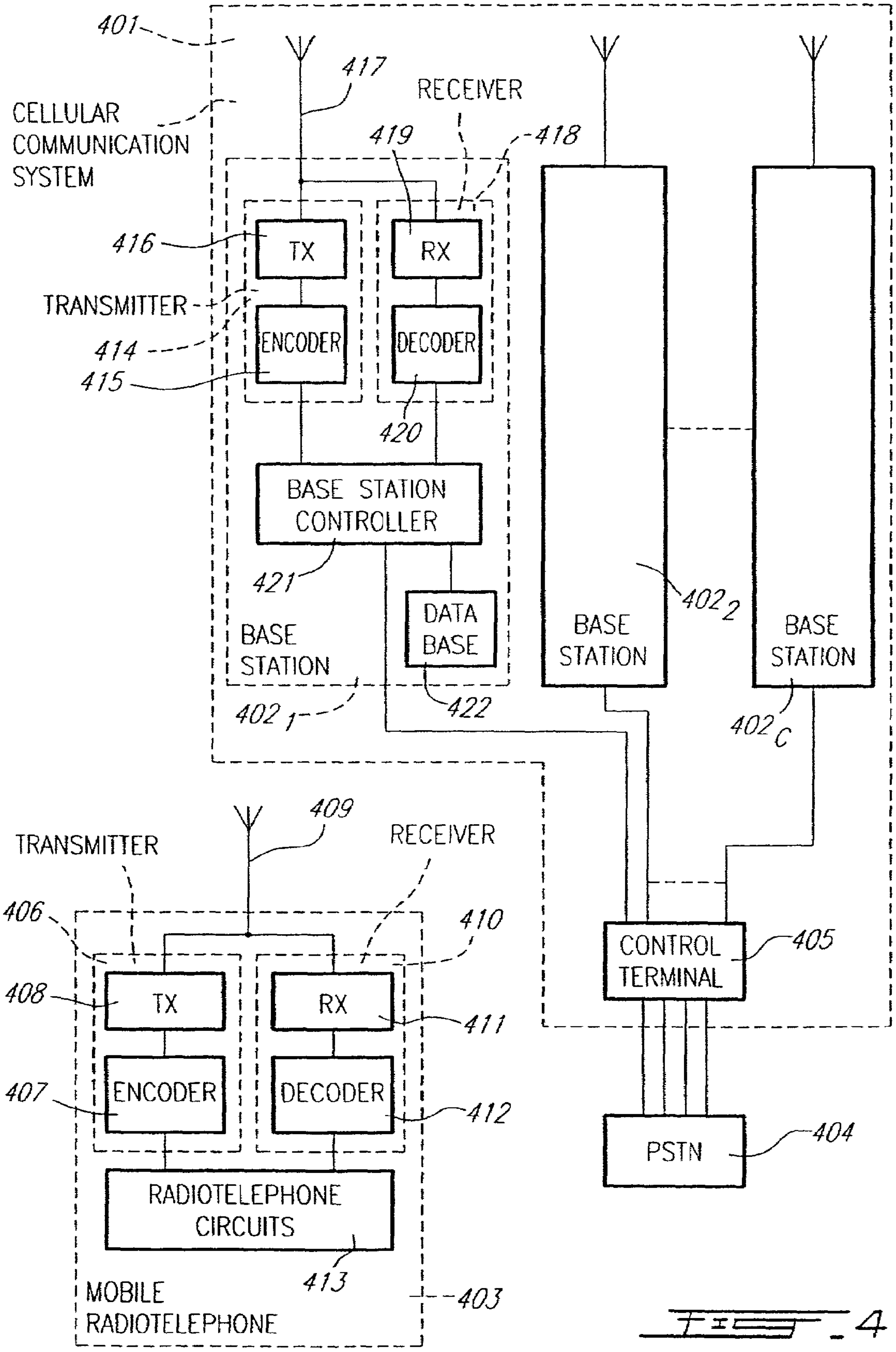
FIG. 4 is a simplified, schematic block diagram of a cellular communication system in which the wideband encoding device of FIG. 1 and the wideband decoding device of FIG. 2 can be used.

As well known to those of ordinary skill in the art, a cellular communication system such as 401 (see FIG. 4) provides a telecommunication service over a large geographic area by dividing that large geographic area into a number C of smaller cells. The C smaller cells are serviced by respective cellular base stations $\mathbf{402}_1$, $\mathbf{402}_2$ . . . $\mathbf{402}_c$ to provide each cell with radio signalling, audio and data channels.

Radio signalling channels are used to page mobile radiotelephones (mobile transmitter/receiver units) such as 403 within the limits of the coverage area (cell) of the cellular base station 402, and to place calls to other radiotelephones 403 located either inside or outside the base station's cell or to another network such as the Public Switched Telephone Network (PSTN) 404.

Once a radiotelephone 403 has successfully placed or received a call, an audio or data channel is established between this radiotelephone 403 and the cellular base station 402 corresponding to the cell in which the radiotelephone 403 is situated, and communication between the base station 402 and radiotelephone 403 is conducted over that audio or data channel. The radiotelephone 403 may also receive control or timing information over a signalling channel while a call is in progress.

If a radiotelephone 403 leaves a cell and enters another adjacent cell while a call is in progress, the radiotelephone 403 hands over the call to an available audio or data channel of the new cell base station 402. If a radiotelephone 403 leaves a cell and enters another adjacent cell while no call is in progress, the radiotelephone 403 sends a control message over the signalling channel to log into the base station 402 of the new cell. In this manner mobile communication over a wide geographical area is possible.

The cellular communication system 401 further comprises a control terminal 405 to control communication between the cellular base stations 402 and the PSTN 404, for example during a communication between a radiotelephone 403 and the PSTN 404, or between a radiotelephone 403 located in a first cell and a radiotelephone 403 situated in a second cell.

Of course, a bidirectional wireless radio communication subsystem is required to establish an audio or data channel between a base station 402 of one cell and a radiotelephone 403 located in that cell. As illustrated in very simplified form in FIG. 4, such a bidirectional wireless radio communication subsystem typically comprises in the radiotelephone 403:

a transmitter 406 including:

an encoder 407 for encoding the voice signal; and a transmission circuit 408 for transmitting the encoded voice signal from the encoder 407 through an antenna such as 409; and a receiver 410 including:

a receiving circuit 411 for receiving a transmitted encoded voice signal usually through the same antenna 409; and a decoder 412 for decoding the received encoded voice signal from the receiving circuit 411.

The radiotelephone further comprises other conventional radiotelephone circuits 413 to which the encoder 407 and decoder 412 are connected and for processing signals therefrom, which circuits 413 are well known to those of ordinary skill in the art and, accordingly, will not be further described in the present specification.

Also, such a bidirectional wireless radio communication subsystem typically comprises in the base station 402:

a transmitter 414 including:

an encoder 415 for encoding the voice signal; and a transmission circuit 416 for transmitting the encoded voice signal from the encoder 415 through an antenna such as 417; and a receiver 418 including:

a receiving circuit 419 for receiving a transmitted encoded voice signal through the same antenna 417 or through another antenna (not shown); and a decoder 420 for decoding the received encoded voice signal from the receiving circuit 419.

The base station 402 further comprises, typically, a base station controller 421, along with its associated database 422, for controlling communication between the control terminal 405 and the transmitter 414 and receiver 418.

As well known to those of ordinary skill in the art, voice encoding is required in order to reduce the bandwidth necessary to transmit sound signal, for example voice signal such as speech, across the bidirectional wireless radio communication subsystem, i.e., between a radiotelephone 403 and a base station 402.

LP voice encoders (such as 415 and 407) typically operating at 13 kbits/second and below such as Code-Excited Linear Prediction (CELP) encoders typically use a LP synthesis filter to model the short-term spectral envelope of the voice signal. The LP information is transmitted, typically, every 10 or 20 ms to the decoder (such 420 and 412) and is extracted at the decoder end.

The novel techniques disclosed in the present specification may apply to different LP-based coding systems. However, a CELP-type coding system is used in the preferred embodiment for the purpose of presenting a non-limitative illustration of these techniques. In the same manner, such techniques can be used with sound signals other than voice and speech as well with other types of wideband signals.

Figure 1:
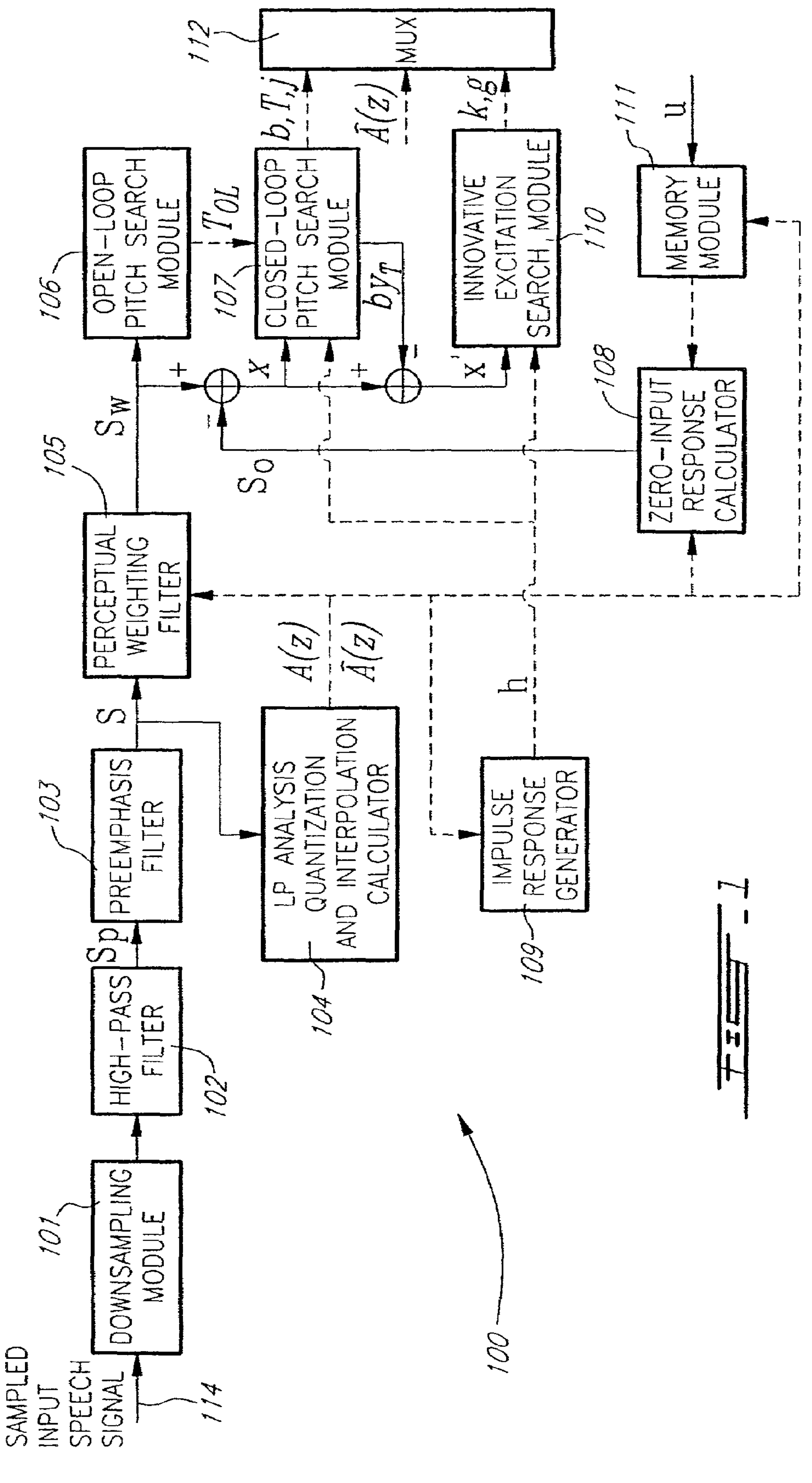
FIG. 1 is a schematic block diagram of a preferred embodiment of wideband encoding device.

FIG. 1 shows a general block diagram of a CELP-type speech encoding device 100 modified to better accommodate wideband signals.

The sampled input speech signal 114 is divided into successive L-sample blocks called “frames”. In each frame, different parameters representing the speech signal in the frame are computed, encoded, and transmitted. LP parameters representing the LP synthesis filter are usually computed once every frame. The frame is further divided into smaller blocks of N samples (blocks of length N), in which excitation parameters (pitch and innovation) are determined. In the CELP literature, these blocks of length N are called “subframes” and the N-sample signals in the subframes are referred to as N-dimensional vectors. In this preferred embodiment, the length N corresponds to 5 ms while the length L corresponds to 20 ms, which means that a frame contains four subframes (N=80 at the sampling rate of 16 kHz and 64 after down-sampling to 12.8 kHz). Various N-dimensional vectors occur in the encoding procedure. A list of the vectors which appear in FIGS. 1 and 2 as well as a list of transmitted parameters are given herein below:

List of the Main N-Dimensional Vectors s Wideband signal input speech vector (after down-sampling, pre-processing, and preemphasis);

$s_w$ Weighted speech vector;

$s_0$ Zero-input response of weighted synthesis filter;

$s_p$ Down-sampled pre-processed signal;

Oversampled synthesized speech signal;

s' Synthesis signal before deemphasis;

$s_d$ Deemphasized synthesis signal;

$s_h$ Synthesis signal after deemphasis and postprocessing;

x Target vector for pitch search;

x' Target vector for innovation search;

h Weighted synthesis filter impulse response;

$v_T$ Adaptive (pitch) codebook vector at delay T;

$y_T$ Filtered pitch codebook vector ($v_T$ convolved with h);

$c_k$ Innovative codevector at index k (k-th entry from the innovation codebook);

$c_f$ Enhanced scaled innovation codevector;

u Excitation signal (scaled innovation and pitch codevectors);

U' Enhanced excitation;

z Band-pass noise sequence;

w' White noise sequence; and w Scaled noise sequence.

List of Transmitted Parameters

STP Short term prediction parameters (defining A(z));

T Pitch lag (or pitch codebook index);

b Pitch gain (or pitch codebook gain);

j Index of the low-pass filter used on the pitch codevector;

k Codevector index (innovation codebook entry); and g Innovation codebook gain.

In this preferred embodiment, the STP parameters are transmitted once per frame and the rest of the parameters are transmitted four times per frame (every subframe).

Encoder Side

The sampled speech signal is encoded on a block by block basis by the encoding device 100 of FIG. 1 which is broken down into eleven modules numbered from 101 to 111.

The input speech is processed into the above mentioned L-sample blocks called frames.

Referring to FIG. 1, the sampled input speech signal 114 is down-sampled in a down-sampling module 101. For example, the signal is down-sampled from 16 kHz down to 12.8 kHz, using techniques well known to those of ordinary skill in the art. Down-sampling down to another frequency can of course be envisaged. Down-sampling increases the coding efficiency, since a smaller frequency bandwidth is encoded. This also reduces the algorithmic complexity since the number of samples in a frame is decreased. The use of down-sampling becomes significant when the bit rate is reduced below 16 kbit/s, although down-sampling is not essential above 16 kbit/s.

After down-sampling, the 320-sample frame of 20 ms is reduced to 256-sample frame (down-sampling ratio of 4/5).

The input frame is then supplied to the optional pre-processing block 102. Pre-processing block 102 may consist of a high-pass filter with a 50 Hz cut-off frequency. High-pass filter 102 removes the unwanted sound components below 50 Hz.

The down-sampled pre-processed signal is denoted by $s_p(n)$, n=0, 1, 2, . . . , L−1, where L is the length of the frame (256 at a sampling frequency of 12.8 kHz). In a preferred embodiment of the preemphasis filter 103, the signal $s_p(n)$ is preemphasized using a filter having the following transfer function:

$$P(z)=1-\mu z^{-1}$$

where μ is a preemphasis factor with a value located between 0 and 1 (a typical value is μ=0.7). A higher-order filter could also be used. It should be pointed out that high-pass filter 102 and preemphasis filter 103 can be interchanged to obtain more efficient fixed-point implementations.

The function of the preemphasis filter 103 is to enhance the high frequency contents of the input signal. It also reduces the dynamic range of the input speech signal, which renders it more suitable for fixed-point implementation.

Without preemphasis, LP analysis in fixed-point using single-precision arithmetic is difficult to implement.

Preemphasis also plays an important role in achieving a proper overall perceptual weighting of the quantization error, which contributes to improved sound quality. This will be explained in more detail herein below.

The output of the preemphasis filter 103 is denoted s(n). This signal is used for performing LP analysis in calculator module 104. LP analysis is a technique well known to those of ordinary skill in the art. In this preferred embodiment, the autocorrelation approach is used. In the autocorrelation approach, the signal s(n) is first windowed using a Hamming window (having usually a length of the order of 30–40 ms). The autocorrelations are computed from the windowed signal, and Levinson-Durbin recursion is used to compute LP filter coefficients, $a_i$, where i=1, . . . , p, and where p is the LP order, which is typically 16 in wideband coding. The parameters $a_i$ are the coefficients of the transfer function of the LP filter, which is given by the following relation:

$$A(z) = 1 + \sum_{i=1}^{p} a_i z^{-1}$$

LP analysis is performed in calculator module 104, which also performs the quantization and interpolation of the LP filter coefficients. The LP filter coefficients are first transformed into another equivalent domain more suitable for quantization and interpolation purposes. The line spectral pair (LSP) and immitance spectral pair (ISP) domains are two domains in which quantization and interpolation can be efficiently performed. The 16 LP filter coefficients, $a_i$, can be quantized in the order of 30 to 50 bits using split or multi-stage quantization, or a combination thereof. The purpose of the interpolation is to enable updating the LP filter coefficients every subframe while transmitting them once every frame, which improves the encoder performance without increasing the bit rate. Quantization and interpolation of the LP filter coefficients is believed to be otherwise well known to those of ordinary skill in the art and, accordingly, will not be further described in the present specification.

The following paragraphs will describe the rest of the coding operations performed on a subframe basis. In the following description, the filter A(z) denotes the unquantized interpolated LP filter of the subframe, and the filter $\hat{A}(z)$ denotes the quantized interpolated LP filter of the subframe.

Perceptual Weighting:

In analysis-by-synthesis encoders, the optimum pitch and innovation parameters are searched by minimizing the mean squared error between the input speech and synthesized speech in a perceptually weighted domain. This is equivalent to minimizing the error between the weighted input speech and weighted synthesis speech.

The weighted signal $s_w(n)$ is computed in a perceptual weighting filter 105. Traditionally, the weighted signal $s_w(n)$ is computed by a weighting filter having a transfer function W(z) in the form:

$$W(z)=A(z/\gamma_1)/A(z/\gamma_2) \text{ where } 0<\gamma_2<\gamma_1\leqq 1$$

As well known to those of ordinary skill in the art, in prior art analysis-by-synthesis (AbS) encoders, analysis shows that the quantization error is weighted by a transfer function $W^{-1}(z)$, which is the inverse of the transfer function of the perceptual weighting filter 105. This result is well described by B. S. Atal and M. R. Schroeder in "Predictive coding of speech and subjective error criteria", IEEE Transaction ASSP, vol. 27, no. 3, pp. 247–254, Jun. 1979. Transfer function $W^{-1}(z)$ exhibits some of the formant structure of the input speech signal. Thus, the masking property of the human ear is exploited by shaping the quantization error so that it has more energy in the formant regions where it will be masked by the strong signal energy present in these regions. The amount of weighting is controlled by the factors $\gamma_1$ and $\gamma_2$.

The above traditional perceptual weighting filter 105 works well with telephone band signals. However, it was found that this traditional perceptual weighting filter 105 is not suitable for efficient perceptual weighting of wideband signals. It was also found that the traditional perceptual weighting filter 105 has inherent limitations in modelling the formant structure and the required spectral tilt concurrently. The spectral tilt is more pronounced in wideband signals due to the wide dynamic range between low and high frequencies. The prior art has suggested to add a tilt filter into W(z) in order to control the tilt and formant weighting of the wideband input signal separately.

A novel solution to this problem is, in accordance with the present invention, to introduce the preemphasis filter 103 at the input, compute the LP filter A(z) based on the preemphasized speech s(n), and use a modified filter W(z) by fixing its denominator.

LP analysis is performed in module 104 on the preemphasized signal s(n) to obtain the LP filter A(z). Also, a new perceptual weighting filter 105 with fixed denominator is used. An example of transfer function for the perceptual weighting filter 104 is given by the following relation:

$$W(z)=A(z/\gamma_1)/(1-\gamma_2 z^{-1}) \text{ where } 0<\gamma_2<\gamma_1\leqq 1$$

A higher order can be used at the denominator. This structure substantially decouples the formant weighting from the tilt.

Note that because A(z) is computed based on the preemphasized speech signal s(n), the tilt of the filter $1/A(z/\gamma_1)$ is less pronounced compared to the case when A(z) is computed based on the original speech. Since deemphasis is performed at the decoder end using a filter having the transfer function:

$$P^{-1}(z)=1/(1-\mu z^{-1}),$$

the quantization error spectrum is shaped by a filter having a transfer function $W^{-1}(z)P^{-1}(z)$. When $\gamma_2$ is set equal to $\mu$, which is typically the case, the spectrum of the quantization error is shaped by a filter whose transfer function is $1/A(z/\gamma1)$, with A(z) computed based on the preemphasized speech signal. Subjective listening showed that this structure for achieving the error shaping by a combination of preemphasis and modified weighting filtering is very efficient for encoding wideband signals, in addition to the advantages of ease of fixed-point algorithmic implementation.

Pitch Analysis:

In order to simplify the pitch analysis, an open-loop pitch lag $T_{OL}$ is first estimated in the open-loop pitch search module 106 using the weighted speech signal $s_w(n)$. Then the closed-loop pitch analysis, which is performed in closed-loop pitch search module 107 on a subframe basis, is restricted around the open-loop pitch lag $T_{OL}$ which significantly reduces the search complexity of the LTP parameters T and b (pitch lag and pitch gain). Open-loop pitch analysis is usually performed in module 106 once every 10 ms (two subframes) using techniques well known to those of ordinary skill in the art.

The target vector x for LTP (Long Term Prediction) analysis is first computed. This is usually done by subtracting the zero-input response $s_0$ of weighted synthesis filter $W(z)/\hat{A}(z)$ from the weighted speech signal $s_w(n)$. This zero-input response $s_0$ is calculated by a zero-input response calculator 108. More specifically, the target vector x is calculated using the following relation:

$$x=s_w-s_0$$

where x is the N-dimensional target vector, $s_w$ is the weighted speech vector in the subframe, and $s_0$ is the zero-input response of filter $W(z)/\hat{A}(z)$ which is the output of the combined filter $W(z)/\hat{A}(z)$ due to its initial states. The zero-input response calculator 108 is responsive to the quantized interpolated LP filter $\hat{A}(z)$ from the LP analysis, quantization and interpolation calculator 104 and to the initial states of the weighted synthesis filter $W(z)/\hat{A}(z)$ stored in memory module 111 to calculate the zero-input response $s_0$ (that part of the response due to the initial states as determined by setting the inputs equal to zero) of filter $W(z)/\hat{A}(z)$. This operation is well known to those of ordinary skill in the art and, accordingly, will not be further described.

Of course, alternative but mathematically equivalent approaches can be used to compute the target vector x.

A N-dimensional impulse response vector h of the weighted synthesis filter $W(z)/\hat{A}(z)$ is computed in the impulse response generator 109 using the LP filter coefficients A(z) and $\hat{A}(z)$ from module 104. Again, this operation is well known to those of ordinary skill in the art and, accordingly, will not be further described in the present specification.

The closed-loop pitch (or pitch codebook) parameters b, T and j are computed in the closed-loop pitch search module 107, which uses the target vector x, the impulse response vector h and the open-loop pitch lag $T_{OL}$ as inputs. Traditionally, the pitch prediction has been represented by a pitch filter having the following transfer function:

$$1/(1-bz^{-T})$$

where b is the pitch gain and T is the pitch delay or lag. In this case, the pitch contribution to the excitation signal u(n) is given by bu(n−T), where the total excitation is given by $$u(n)=bu(n-T)+gc_k(n)$$

with g being the innovative codebook gain and $c_k(n)$ the innovative codevector at index k.

This representation has limitations if the pitch lag T is shorter than the subframe length N. In another representation, the pitch contribution can be seen as a pitch codebook containing the past excitation signal. Generally, each vector in the pitch codebook is a shift-by-one version of the previous vector (discarding one sample and adding a new sample). For pitch lags T>N, the pitch codebook is equivalent to the filter structure $(1/(1-bz^{-T})$, and a pitch codebook vector $v_T(n)$ at pitch lag T is given by $$v_T(n)=u(n-T),\ n=0, \ldots, N-1.$$

For pitch lags T shorter than N, a vector $v_T(n)$ is built by repeating the available samples from the past excitation until the vector is completed (this is not equivalent to the filter structure).

In recent encoders, a higher pitch resolution is used which significantly improves the quality of voiced sound segments. This is achieved by oversampling the past excitation signal using polyphase interpolation filters. In this case, the vector $v_T(n)$ usually corresponds to an interpolated version of the past excitation, with pitch lag T being a non-integer delay (e.g. 50.25).

The pitch search consists of finding the best pitch lag T and gain b that minimize the mean squared weighted error E between the target vector x and the scaled filtered past excitation. Error E being expressed as:

$$E=\|x-by_T\|^2$$

where $y_T$ is the filtered pitch codebook vector at pitch lag T:

$$y_T(n) = v_T(n) * h(n) = \sum_{i=0}^{n} v_T(i)h(n-i),$$

n=0, . . . , N−1.

It can be shown that the error E is minimized by maximizing the search criterion $$c = \frac{x^t y_T}{\sqrt{y_T^t y_T}}$$

where t denotes vector transpose.

In the preferred embodiment of the present invention, a ⅓ subsample pitch resolution is used, and the pitch (pitch codebook) search is composed of three stages.

In the first stage, an open-loop pitch lag $T_{OL}$ is estimated in open-loop pitch search module 106 in response to the weighted speech signal $s_w(n)$. As indicated in the foregoing description, this open-loop pitch analysis is usually performed once every 10 ms (two subframes) using techniques well known to those of ordinary skill in the art.

In the second stage, the search criterion C is searched in the closed-loop pitch search module 107 for integer pitch lags around the estimated open-loop pitch lag $T_{OL}$ (usually ±5), which significantly simplifies the search procedure. A simple procedure is used for updating the filtered codevector $y_T$ without the need to compute the convolution for every pitch lag.

Once an optimum integer pitch lag is found in the second stage, a third stage of the search (module 107) tests the fractions around that optimum integer pitch lag.

When the pitch predictor is represented by a filter of the form $1/(1-bz^{-T})$, which is a valid assumption for pitch lags T>N, the spectrum of the pitch filter exhibits a harmonic structure over the entire frequency range, with a harmonic frequency related to 1/T. In case of wideband signals, this structure is not very efficient since the harmonic structure in wideband signals does not cover the entire extended spectrum. The harmonic structure exists only up to a certain frequency, depending on the speech segment. Thus, in order to achieve efficient representation of the pitch contribution in voiced segments of wideband speech, the pitch prediction filter needs to have the flexibility of varying the amount of periodicity over the wideband spectrum.

A new method which achieves efficient modeling of the harmonic structure of the speech spectrum of wideband signals is disclosed in the present specification, whereby several forms of low pass filters are applied to the past excitation and the low pass filter with higher prediction gain is selected.

When subsample pitch resolution is used, the low pass filters can be incorporated into the interpolation filters used to obtain the higher pitch resolution. In this case, the third stage of the pitch search, in which the fractions around the chosen integer pitch lag are tested, is repeated for the several interpolation filters having different low-pass characteristics and the fraction and filter index which maximize the search criterion C are selected.

A simpler approach is to complete the search in the three stages described above to determine the optimum fractional pitch lag using only one interpolation filter with a certain frequency response, and select the optimum low-pass filter shape at the end by applying the different predetermined low-pass filters to the chosen pitch codebook vector $v_T$ and select the low-pass filter which minimizes the pitch prediction error. This approach is discussed in detail below.

Figure 3:
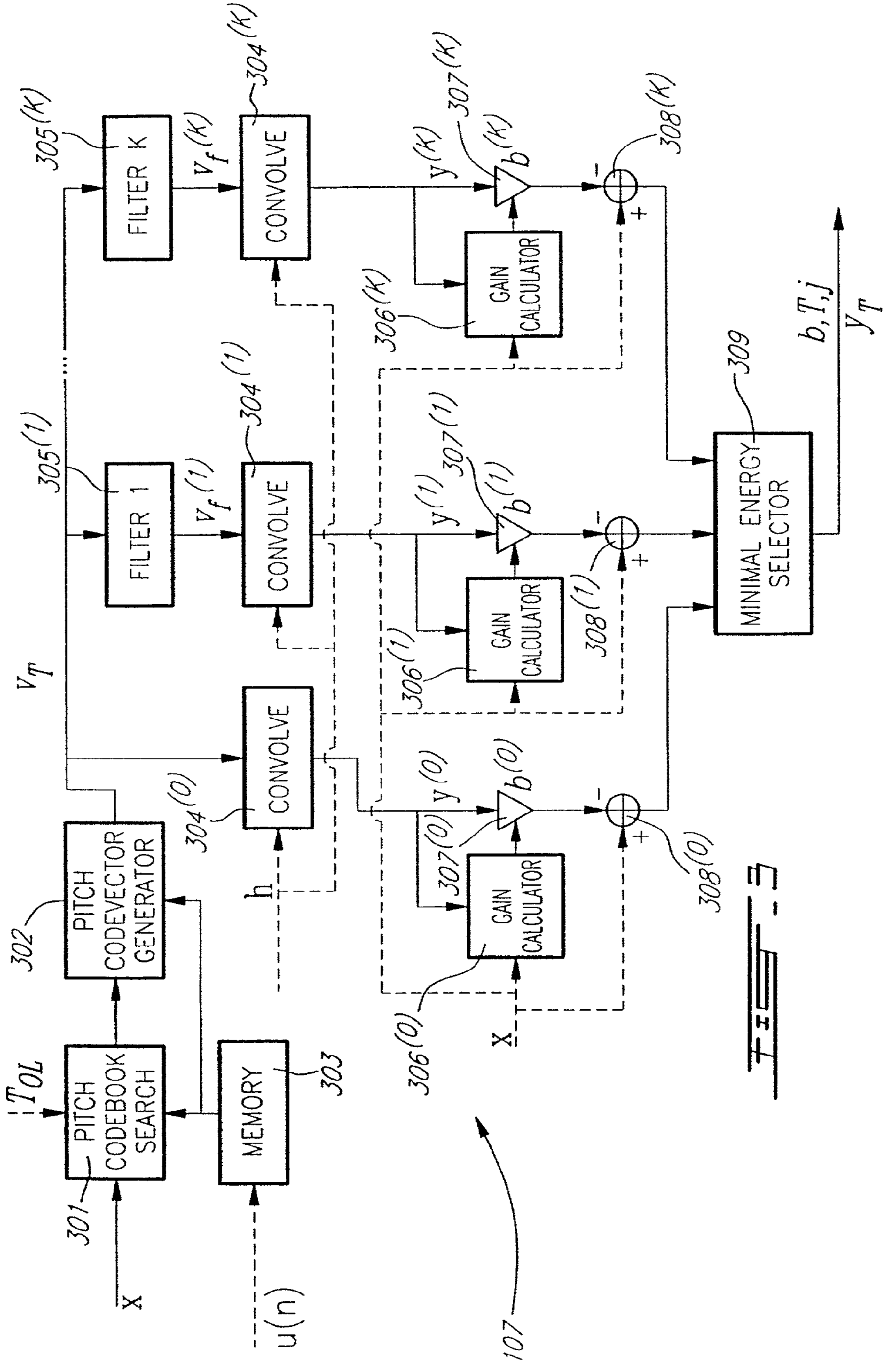
FIG. 3 is a schematic block diagram of a preferred embodiment of pitch analysis device.

FIG. 3 illustrates a schematic block diagram of a preferred embodiment of the proposed approach.

In memory module 303, the past excitation signal u(n), n<0, is stored. The pitch codebook search module 301 is responsive to the target vector x, to the open-loop pitch lag $T_{OL}$ and to the past excitation signal u(n), n<0, from memory module 303 to conduct a pitch codebook (pitch codebook) search minimizing the above-defined search criterion C. From the result of the search conducted in module 301, module 302 generates the optimum pitch codebook vector $v_T$. Note that since a sub-sample pitch resolution is used (fractional pitch), the past excitation signal u(n), n<0, is interpolated and the pitch codebook vector $v_T$ corresponds to the interpolated past excitation signal. In this preferred embodiment, the interpolation filter (in module 301, but not shown) has a low-pass filter characteristic removing the frequency contents above 7000 Hz.

In a preferred embodiment, K filter characteristics are used; these filter characteristics could be low-pass or band-pass filter characteristics. Once the optimum codevector $v_T$ is determined and supplied by the pitch codevector generator 302, K filtered versions of $v_T$ are computed respectively using K different frequency shaping filters such as $305^{(j)}$, where j=1, 2, . . . , K. These filtered versions are denoted $v_f^{(j)}$, where j=1, 2, . . . , K. The different vectors $v_f^{(j)}$ are convolved in respective modules 304$^{(j)}$, where j=0, 1, 2, . . . , K, with the impulse response h to obtain the vectors $y^{(j)}$, where j=0, 1, 2, . . . , K. To calculate the mean squared pitch prediction error for each vector $y^{(j)}$, the value $y^{(j)}$ is multiplied by the gain b by means of a corresponding amplifier 307$^{(j)}$ and the value $by^{(j)}$ is subtracted from the target vector x by means of a corresponding subtractor 308$^{(j)}$. Selector 309 selects the frequency shaping filter 305$^{(j)}$ which minimizes the mean squared pitch prediction error $$e^{(j)}=\|x-b^{(j)}y^{(j)}\|^2,\ j=1,\ 2,\ \ldots,\ K$$

To calculate the mean squared pitch prediction error $e^{(j)}$ for each value of $y^{(j)}$, the value $y^{(j)}$ is multiplied by the gain b by means of a corresponding amplifier 307$^{(j)}$ and the value $b^{(j)}y^{(j)}$ is subtracted from the target vector x by means of subtractors 308$^{(j)}$. Each gain $b^{(j)}$ is calculated in a corresponging gain calculator 306$^{(j)}$ in association with the frequency shaping filter at index j, using the following relationship:

$$b^{(j)}=x^t y^{(j)}/\|y^{(j)}\|^2$$

In selector 309, the parameters b, T, and j are chosen based on $v_T$ or $v_f^{(j)}$ which minimizes the mean squared pitch prediction error e.

Referring back to FIG. 1, the pitch codebook index T is encoded and transmitted to multiplexer 112. The pitch gain b is quantized and transmitted to multiplexer 112. With this new approach, extra information is needed to encode the index j of the selected frequency shaping filter in multiplexer 112. For example, if three filters are used (j=0, 1, 2, 3), then two bits are needed to represent this information. The filter index information j can also be encoded jointly with the pitch gain b.

Innovative Codebook Search:

Once the pitch, or LTP (Long Term Prediction) parameters b, T, and j are determined, the next step is to search for the optimum innovative excitation by means of search module 110 of FIG. 1. First, the target vector x is updated by subtracting the LTP contribution:

$$x'=x-by_T$$

where b is the pitch gain and $y_T$ is the filtered pitch codebook vector (the past excitation at delay T filtered with the selected low pass filter and convolved with the inpulse response h as described with reference to FIG. 3).

The search procedure in CELP is performed by finding the optimum excitation codevector $c_k$ and gain g which minimize the mean-squared error between the target vector and the scaled filtered codevector $$E=\|x'-gHc_k\|^2$$

where H is a lower triangular convolution matrix derived from the impulse response vector h.

In the preferred embodiment of the present invention, the innovative codebook search is performed in module 110 by means of an algebraic codebook as described in U.S. Pat. No. 5,444,816 (Adoul et al.) issued on Aug. 22, 1995; U.S. Pat. No. 5,699,482 granted to Adoul et al., on Dec. 17, 1997; U.S. Pat. No. 5,754,976 granted to Adoul et al., on May 19, 1998; and U.S. Pat. No. 5,701,392 (Adoul et al.) dated Dec. 23, 1997.

Once the optimum excitation codevector $c_k$ and its gain g are chosen by module 110, the codebook index k and gain g are encoded and transmitted to multiplexer 112.

Referring to FIG. 1, the parameters b, T, j, $\hat{A}(z)$, k and g are multiplexed through the multiplexer 112 before being transmitted through a communication channel.

Memory Update:

In memory module 111 (FIG. 1), the states of the weighted synthesis filter $W(z)/\hat{A}(z)$ are updated by filtering the excitation signal $u=gc_k+bv_T$ through the weighted synthesis filter. After this filtering, the states of the filter are memorized and used in the next subframe as initial states for computing the zero-input response in calculator module 108.

As in the case of the target vector x, other alternative but mathematically equivalent approaches well known to those of ordinary skill in the art can be used to update the filter states.

Decoder Side

Figure 2:
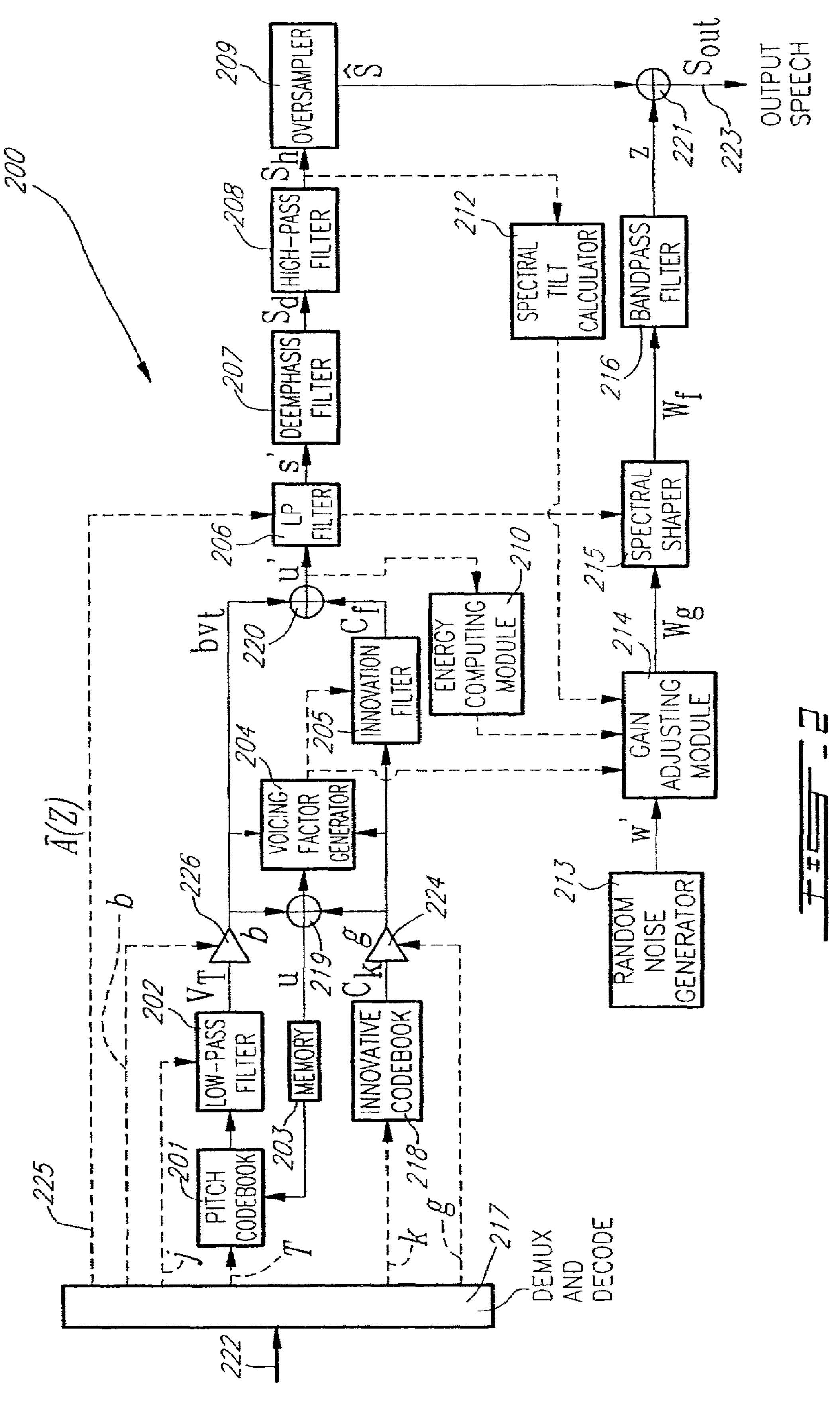
FIG. 2 is a schematic block diagram of a preferred embodiment of wideband decoding device.

The speech decoding device 200 of FIG. 2 illustrates the various steps carried out between the digital input 222 (input stream to the demultiplexer 217) and the output sampled speech 223 (output of the adder 221).

Demultiplexer 217 extracts the synthesis model parameters from the binary information received from a digital input channel. From each received binary frame, the extracted parameters are:

the short-term prediction parameters (STP) $\hat{A}(z)$ (once per frame);

the long-term prediction (LTP) parameters T, b, and j (for each subframe); and the innovation codebook index k and gain g (for each subframe).

The current speech signal is synthesized based on these parameters as will be explained hereinbelow.

The innovative codebook 218 is responsive to the index k to produce the innovation codevector $c_k$, which is scaled by the decoded gain factor g through an amplifier 224. In the preferred embodiment, an innovative codebook 218 as described in the above mentioned U.S. Pat. Nos. 5,444,816; 5,699,482; 5,754,976; and 5,701,392 is used to represent the innovative codevector $c_k$.

The generated scaled codevector $gc_k$ at the output of the amplifier 224 is processed through a innovation filter 205.

Periodicity Enhancement:

The generated scaled codevector at the output of the amplifier 224 is processed through a frequency-dependent pitch enhancer 205.

Enhancing the periodicity of the excitation signal u improves the quality in case of voiced segments. This was done in the past by filtering the innovation vector from the innovative codebook (fixed codebook) 218 through a filter in the form $1/(1-\epsilon b z^{-T})$ where $\epsilon$ is a factor below 0.5 which controls the amount of introduced periodicity. This approach is less efficient in case of wideband signals since it introduces periodicity over the entire spectrum. A new alternative approach, which is part of the present invention, is disclosed whereby periodicity enhancement is achieved by filtering the innovative codevector $c_k$ from the innovative (fixed) codebook through an innovation filter 205 (F(z)) whose frequency response emphasizes the higher frequencies more than lower frequencies. The coefficients of F(z) are related to the amount of periodicity in the excitation signal u.

Many methods known to those skilled in the art are available for obtaining valid periodicity coefficients. For example, the value of gain b provides an indication of periodicity. That is, if gain b is close to 1, the periodicity of the excitation signal u is high, and if gain b is less than 0.5, then periodicity is low.

Another efficient way to derive the filter F(z) coefficients used in a preferred embodiment, is to relate them to the amount of pitch contribution in the total excitation signal u. This results in a frequency response depending on the subframe periodicity, where higher frequencies are more strongly emphasized (stronger overall slope) for higher pitch gains. Innovation filter 205 has the effect of lowering the energy of the innovative codevector $c_k$ at low frequencies when the excitation signal u is more periodic, which enhances the periodicity of the excitation signal u at lower frequencies more than higher frequencies. Suggested forms for innovation filter 205 are $$F(z)=1\sigma z^{-1}, \tag{1}$$

$$F(z)=-\alpha z+1-\alpha z^{-1} \tag{2}$$

or where aσ or α are periodicity factors derived from the level of periodicity of the excitation signal u.

The second three-term form of F(z) is used in a preferred embodiment. The periodicity factor α is computed in the voicing factor generator 204. Several methods can be used to derive the periodicity factor α based on the periodicity of the excitation signal u. Two methods are presented below.

Method 1:

The ratio of pitch contribution to the total excitation signal u is first computed in voicing factor generator 204 by $$R_p = \frac{b^2 v_T^t v_T}{u^t u} = \frac{b^2 \sum_{n=0}^{N-1} v_T^2(n)}{\sum_{n=0}^{N-1} u^2(n)}$$

where $v_T$ is the pitch codebook vector, b is the pitch gain, and u is the excitation signal u given at the output of the adder 219 by $$u = gc_k + bv_T$$

Note that the term $bv_T$ has its source in the pitch codebook (pitch codebook) 201 in response to the pitch lag T and the past value of u stored in memory 203. The pitch codevector $v_T$ from the pitch codebook 201 is then processed through a low-pass filter 202 whose cut-off frequency is adjusted by means of the index j from the demultiplexer 217. The resulting codevector $v_T$ is then multiplied by the gain b from the demultiplexer 217 through an amplifier 226 to obtain the signal $bv_T$.

The factor α is calculated in voicing factor generator 204 by $$\alpha = qR_p \text{ bounded by } \alpha < q$$

where q is a factor which controls the amount of enhancement (q is set to 0.25 in this preferred embodiment).

Method 2:

Another method used in a preferred embodiment of the invention for calculating periodicity factor α is discussed below.

First, a voicing factor $r_v$ is computed in voicing factor generator 204 by $$r_v = (E_v - E_c)/(E_v + E_c)$$

where $E_v$ is the energy of the scaled pitch codevector $bv_T$ and $E_c$ is the energy of the scaled innovative codevector $gc_k$. That is $$E_v = b^2 v_T^t v_T = b^2 \sum_{n=0}^{N-1} v_T^2(n)$$

and $$E_c = g^2 c_k^t c_k = g^2 \sum_{n=0}^{N-1} c_k^2(n).$$

Note that the value of $r_v$, lies between −1 and 1 (1 corresponds to purely voiced signals and −1 corresponds to purely unvoiced signals).

In this preferred embodiment, the factor α is then computed in voicing factor generator 204 by $$\alpha = 0.125\,(1 + r_v)$$

which corresponds to a value of 0 for purely unvoiced signals and 0.25 for purely voiced signals.

In the first, two-term form of F(z), the periodicity factor σ can be approximated by using σ=2α in methods 1 and 2 above. In such a case, the periodicity factor σ is calculated as follows in method 1 above:

$$\sigma=2qR_p \text{ bounded by } \sigma<2q.$$

In method 2, the periodicity factor σ is calculated as follows:

$$\sigma=0.25(1+r_v).$$

The enhanced signal $c_f$ is therefore computed by filtering the scaled innovative codevector $gc_k$ through the innovation filter 205 (F(z)).

The enhanced excitation signal u' is computed by the adder 220 as:

$$u'=c_f+bv_T$$

Note that this process is not performed at the encoder 100. Thus, it is essential to update the content of the pitch codebook 201 using the excitation signal u without enhancement to keep synchronism between the encoder 100 and decoder 200. Therefore, the excitation signal u is used to update the memory 203 of the pitch codebook 201 and the enhanced excitation signal u' is used at the input of the LP synthesis filter 206.

Synthesis and Deemphasis

The synthesized signal s' is computed by filtering the enhanced excitation signal u' through the LP synthesis filter 206 which has the form 1/Â(z), where Â(z) is the interpolated LP filter in the current subframe. As can be seen in FIG. 2, the quantized LP coefficients Â(z) on line 225 from demultiplexer 217 are supplied to the LP synthesis filter 206 to adjust the parameters of the LP synthesis filter 206 accordingly. The deemphasis filter 207 is the inverse of the preemphasis filter 103 of FIG. 1. The transfer function of the deemphasis filter 207 is given by $$D(z)=1/(1-\mu z^{-1})$$

where μ is a preemphasis factor with a value located between 0 and 1 (a typical value is μ=0.7). A higher-order filter could also be used.

The vector s' is filtered through the deemphasis filter D(z) (module 207) to obtain the vector $s_d$, which is passed through the high-pass filter 208 to remove the unwanted frequencies below 50 Hz and further obtain $s_h$.

Oversampling and High-Frequency Regeneration

The over-sampling module 209 conducts the inverse process of the down-sampling module 101 of FIG. 1. In this preferred embodiment, oversampling converts from the 12.8 kHz sampling rate to the original 16 kHz sampling rate, using techniques well known to those of ordinary skill in the art. The oversampled synthesis signal is denoted Ŝ. Signal Ŝ is also referred to as the synthesized wideband intermediate signal.

The oversampled synthesis Ŝ signal does not contain the higher frequency components which were lost by the down-sampling process (module 101 of FIG. 1) at the encoder 100. This gives a low-pass perception to the synthesized speech signal. To restore the full band of the original signal, a high frequency generation procedure is disclosed. This procedure is performed in modules 210 to 216, and adder 221, and requires input from voicing factor generator 204 (FIG. 2).

In this new approach, the high frequency contents are generated by filling the upper part of the spectrum with a white noise properly scaled in the excitation domain, then converted to the speech domain, preferably by shaping it with the same LP synthesis filter used for synthesizing the down-sampled signal Ŝ.

The high frequency generation procedure in accordance with the present invention is described hereinbelow.

The random noise generator 213 generates a white noise sequence w' with a flat spectrum over the entire frequency bandwidth, using techniques well known to those of ordinary skill in the art. The generated sequence is of length N' which is the subframe length in the original domain. Note that N is the subframe length in the down-sampled domain. In this preferred embodiment, N=64 and N'=80 which correspond to 5 ms.

The white noise sequence is properly scaled in the gain adjusting module 214. Gain adjustment comprises the following steps. First, the energy of the generated noise sequence w' is set equal to the energy of the enhanced excitation signal u' computed by an energy computing module 210, and the resulting scaled noise sequence is given by $$w(n) = w'(n)\sqrt{\frac{\sum_{n=0}^{N-1} u'^2(n)}{\sum_{n=0}^{N'-1} w'^2(n)}},$$

n=0, . . . , N'−1.

The second step in the gain scaling is to take into account the high frequency contents of the synthesized signal at the output of the voicing factor generator 204 so as to reduce the energy of the generated noise in case of voiced segments (where less energy is present at high frequencies compared to unvoiced segments). In this preferred embodiment, measuring the high frequency contents is implemented by measuring the tilt of the synthesis signal through a spectral tilt calculator 212 and reducing the energy accordingly. Other measurements such as zero crossing measurements can equally be used. When the tilt is very strong, which corresponds to voiced segments, the noise energy is further reduced. The tilt factor is computed in module 212 as the first correlation coefficient of the synthesis signal $s_h$ and it is given by:

$$\text{tilt} = \frac{\sum_{n=1}^{N-1} s_h(n)s_h(n-1)}{\sum_{n=0}^{N-1} s_h^2(n)},$$

conditioned by tilt≧0 and tilt≧$r_v$.

where voicing factor $r_v$ is given by $$r_v=(E_v E_c)/E_v+E_c)$$

where $E_v$ is the energy of the scaled pitch codevector by $bv_T$ and $E_c$ is the energy of the scaled innovative codevector $gc_k$, as described earlier. Voicing factor $r_v$ is most often less than tilt but this condition was introduced as a precaution against high frequency tones where the tilt value is negative and the value of $r_v$ is high. Therefore, this condition reduces the noise energy for such tonal signals.

The tilt value is 0 in case of flat spectrum and 1 in case of strongly voiced signals, and it is negative in case of unvoiced signals where more energy is present at high frequencies.

Different methods can be used to derive the scaling factor $g_t$ from the amount of high frequency contents. In this invention, two methods are given based on the tilt of signal described above.

Method 1:

The scaling factor $g_t$ is derived from the tilt by $$g_t = 1 - \text{tilt bounded by } 0.2 \leqq g_t \leqq 1.0$$

For strongly voiced signal where the tilt approaches 1, $g_t$ is 0.2 and for strongly unvoiced signals $g_t$ becomes 1.0.

Method 2:

The tilt factor $g_t$ is first restricted to be larger or equal to zero, then the scaling factor is derived from the tilt by $$g_t = 10^{-0.6 tilt}$$

The scaled noise sequence $w_g$ produced in gain adjusting module 214 is therefore given by:

$$w_g = g_t w.$$

When the tilt is close to zero, the scaling factor $g_t$ is close to 1, which does not result in energy reduction. When the tilt value is 1, the scaling factor $g_t$ results in a reduction of 12 dB in the energy of the generated noise.

Once the noise is properly scaled ($w_g$), it is brought into the speech domain using the spectral shaper 215. In the preferred embodiment, this is achieved by filtering the noise $w_g$ through a bandwidth expanded version of the same LP synthesis filter used in the down-sampled domain ($1/\hat{A}(z/0.8)$). The corresponding bandwidth expanded LP filter coefficients are calculated in spectral shaper 215.

The filtered scaled noise sequence $w_f$ is then band-pass filtered to the required frequency range to be restored using the band-pass filter 216. In the preferred embodiment, the band-pass filter 216 restricts the noise sequence to the frequency range 5.6–7.2 kHz. The resulting band-pass filtered noise sequence z is added in adder 221 to the over-sampled synthesized speech signal $\hat{s}$ to obtain the final reconstructed sound signal $s_{out}$ on the output 223.

Although the present invention has been described hereinabove by way of a preferred embodiment thereof, this embodiment can be modified at will, within the scope of the appended claims, without departing from the spirit and nature of the subject invention. Even though the preferred embodiment discusses the use of wideband speech signals, it will be obvious to those skilled in the art that the subject invention is also directed to other embodiments using wideband signals in general and that it is not necessarily limited to speech applications.

What is claimed is:

1. A decoder for producing a synthesized wideband signal, comprising:

a) a signal fragmenting device for receiving an encoded version of a wideband signal previously down-sampled during encoding and extracting from said encoded wideband signal version at least pitch codebook parameters, innovative codebook parameters, and linear prediction filter coefficients;

b) a pitch codebook responsive to said pitch codebook parameters for producing a pitch codevector;

c) an innovative codebook responsive to said innovative codebook parameters for producing an innovative codevector;

d) a combiner circuit for combining said pitch codevector and said innovative codevector to thereby produce an excitation signal;

e) a signal synthesis device including a linear prediction filter for filtering said excitation signal in relation to said linear prediction filter coefficients to thereby produce a synthesized wideband signal, and an oversampler responsive to said synthesized wideband signal for producing an over-sampled signal version of the synthesized wideband signal; and f) a high-frequency content recovering device comprising:

i) a random noise generator for producing a noise sequence having a given spectrum;

ii) a spectral shaping unit for shaping the spectrum of the noise sequence in relation to linear prediction filter coefficients related to said down-sampled wideband signal; and iii) a signal injection circuit for injecting said spectrally-shaped noise sequence in said over-sampled synthesized signal version to thereby produce said full-spectrum synthesized wideband signal.

2. A decoder for producing a synthesized wideband signal as defined in claim 1, wherein said random noise generator comprises a random white noise generator for producing a white noise sequence whereby said spectral shaping unit produces a spectrally-shaped white noise sequence.

3. A decoder for producing a synthesized wideband signal as defined in claim 2, wherein said spectral shaping unit comprises:

a) a gain adjustment module, responsive to said white noise sequence and a set of gain adjusting parameters, for producing a scaled white noise sequence;

b) a spectral shaper for filtering said scaled white noise sequence in relation to a bandwidth expanded version of the linear prediction filter coefficients to produce a filtered scaled white noise sequence characterized by a frequency bandwidth generally higher than a frequency bandwidth of said over-sampled synthesized signal version; and c) a band-pass filter responsive to said filtered scaled white noise sequence for producing a band-pass filtered scaled white noise sequence to be subsequently injected in said over-sampled synthesized signal version as said spectrally-shaped white noise sequence.

4. A decoder for producing a synthesized wideband signal as defined in claim 3, further comprising:

a) a voicing factor generator responsive to said pitch and innovative codevectors for calculating a voicing factor for forwarding to said gain adjustment module;

b) an energy computing module responsive to said excitation signal for calculating an excitation energy for forwarding to said gain adjustment module; and c) a spectral tilt calculator responsive to said synthesized signal for calculating a tilt scaling factor for forwarding to said gain adjustment module;

wherein said set of gain adjusting parameters comprises said voicing factor, said excitation energy, and said tilt scaling factor.

5. A decoder for producing a synthesized wideband signal as defined in claim 4, wherein said voicing factor generator comprises a means for calculating said voicing factor in relation to an energy of a gain-scaled version of the pitch codevector and an energy of a gain-scaled version of the innovative codevector.

6. A decoder for producing a synthesized wideband signal as defined in claim 4, wherein said gain adjustment module comprises a means for calculating an energy scaling factor in relation to the white noise sequence and an enhanced excitation signal derived from said excitation signal.

7. A decoder for producing a synthesized wideband signal as defined in claim 4, wherein said spectral tilt calculator comprises a means for calculating said tilt scaling factor in relation to the synthesized signal and the voicing factor.

8. A decoder for producing a synthesized wideband signal as defined in claim 3, wherein said band-pass filter comprises a frequency bandwidth located between 5.6 kHz and 7.2 kHz.

9. A decoder for producing a synthesized wideband signal, comprising:

a) a signal fragmenting device for receiving an encoded version of a wideband signal previously down-sampled during encoding and extracting from said encoded wideband signal version at least pitch codebook parameters, innovative codebook parameters, and linear prediction filter coefficients;

b) a pitch codebook responsive to said pitch codebook parameters for producing a pitch codevector;

c) an innovative codebook responsive to said innovative codebook parameters for producing an innovative codevector;

d) a combiner circuit for combining said pitch codevector and said innovative codevector to thereby produce an excitation signal; and e) a signal synthesis device including a linear prediction filter for filtering said excitation signal in relation to said linear prediction filter coefficients to thereby produce a synthesized wideband signal, and an oversampler responsive to said synthesized wideband signal for producing an over-sampled signal version of the synthesized wideband signal;

the improvement a high-frequency content recovering device comprising:

i) a random noise generator for producing a noise sequence having a given spectrum;

ii) a spectral shaping unit for shaping the spectrum of the noise sequence in relation to linear prediction filter coefficients related to said down-sampled wideband signal; and iii) a signal injection circuit for injecting said spectrally-shaped noise sequence in said over-sampled synthesized signal version to thereby produce said full-spectrum synthesized wideband signal.

10. A decoder for producing a synthesized wideband signal as defined in claim 9, wherein said random noise generator comprises a random white noise generator for producing a white noise sequence whereby said spectral shaping unit produces a spectrally-shaped white noise sequence.

11. A decoder for producing a synthesized wideband signal as defined in claim 10, wherein said spectral shaping unit comprises:

a) a gain adjustment module, responsive to said white noise sequence and a set of gain adjusting parameters, for producing a scaled white noise sequence;

b) a spectral shaper for filtering said scaled white noise sequence in relation to a bandwidth expanded version of the linear prediction filter coefficients to produce a filtered scaled white noise sequence characterized by a frequency bandwidth generally higher than a frequency bandwidth of said over-sampled synthesized signal version; and c) a band-pass filter responsive to said filtered scaled white noise sequence for producing a band-pass filtered scaled white noise sequence to be subsequently injected in said over-sampled synthesized signal version as said spectrally-shaped white noise sequence.

12. A decoder for producing a synthesized wideband signal as defined in claim 11, further comprising:

a) a voicing factor generator responsive to said pitch and innovative codevectors for calculating a voicing factor for forwarding to said gain adjustment module;

b) an energy computing module responsive to said excitation signal for calculating an excitation energy for forwarding to said gain adjustment module; and c) a spectral tilt calculator responsive to said synthesized signal for calculating a tilt scaling factor for forwarding to said gain adjustment module;

wherein said set of gain adjusting parameters comprises said voicing factor, said excitation energy, and said tilt scaling factor.

13. A decoder for producing a synthesized wideband signal as defined in claim 12, wherein said voicing factor generator comprises a means for calculating said voicing factor in relation to an energy of a gain-scaled version of the pitch codevector and an energy of a gain-scaled version of the innovative codevector.

14. A decoder for producing a synthesized wideband signal as defined in claim 12, wherein said gain adjustment module comprises a means for calculating an energy scaling factor in relation to the white noise sequence and an enhanced excitation signal derived from said excitation signal.

15. A decoder for producing a synthesized wideband signal as defined in claim 12, wherein said spectral tilt calculator comprises a means for calculating said tilt scaling factor in relation to the synthesized signal and the voicing factor.

16. A decoder for producing a synthesized wideband signal as defined in claim 11, wherein said band-pass filter comprises a frequency bandwidth located between 5.6 kHz and 7.2 kHz.

17. A cellular communication system for servicing a geographical area divided into a plurality of cells, comprising:

a) mobile transmitter/receiver units;

b) cellular base stations respectively situated in said cells;

c) a control terminal for controlling communication between the cellular base stations;

d) a bidirectional wireless communication sub-system between each mobile unit situated in one cell and the cellular base station of said one cell, said bidirectional wireless communication subsystem comprising, in both the mobile unit and the cellular base station:

i) a transmitter including an encoder for encoding a wideband signal and a transmission circuit for transmitting the encoded wideband signal; and ii) a receiver including a receiving circuit for receiving a transmitted encoded wideband signal and a decoder for decoding the received encoded wideband signal, said decoder comprising:

(1) a signal fragmenting device for receiving an encoded version of a wideband signal previously down-sampled during encoding and extracting from said encoded wideband signal version at least pitch codebook parameters, innovative codebook parameters, and linear prediction filter coefficients;

(2) a pitch codebook responsive to said pitch codebook parameters for producing a pitch codevector;

(3) an innovative codebook responsive to said innovative codebook parameters for producing an innovative codevector;

(4) a combiner circuit for combining said pitch codevector and said innovative codevector to thereby produce an excitation signal;

(5) a signal synthesis device including a linear prediction filter for filtering said excitation signal in relation to said linear prediction filter coefficients to thereby produce a synthesized wideband signal, and an oversampler responsive to said synthesized wideband signal for producing an over-sampled signal version of the synthesized wideband signal; and (6) a high-frequency content recovering device comprising:

a) a random noise generator for producing a noise sequence having a given spectrum;

b) a spectral shaping unit for shaping the spectrum of the noise sequence in relation to linear prediction filter coefficients related to said down-sampled wideband signal; and c) a signal injection circuit for injecting said spectrally-shaped noise sequence in said over-sampled synthesized signal version to thereby produce said full-spectrum synthesized wideband signal.

18. A cellular communication system as defined in claim 17, wherein said random noise generator comprises a random white noise generator for producing a white noise sequence whereby said spectral shaping unit produces a spectrally-shaped white noise sequence.

19. A cellular communication system as defined in claim 18, wherein said spectral shaping unit comprises:

a) a gain adjustment module, responsive to said white noise sequence and a set of gain adjusting parameters, for producing a scaled white noise sequence;

b) a spectral shaper for filtering said scaled white noise sequence in relation to a bandwidth expanded version of the linear prediction filter coefficients to produce a filtered scaled white noise sequence characterized by a frequency bandwidth generally higher than a frequency bandwidth of said over-sampled synthesized signal version; and c) a band-pass filter responsive to said filtered scaled white noise sequence for producing a band-pass filtered scaled white noise sequence to be subsequently injected in said over-sampled synthesized signal version as said spectrally-shaped white noise sequence.

20. A cellular communication system as defined in claim 19, further comprising:

a) a voicing factor generator responsive to said pitch and innovative codevectors for calculating a voicing factor for forwarding to said gain adjustment module;

b) an energy computing module responsive to said excitation signal for calculating an excitation energy for forwarding to said gain adjustment module; and c) a spectral tilt calculator responsive to said synthesized signal for calculating a tilt scaling factor for forwarding to said gain adjustment module;

wherein said set of gain adjusting parameters comprises said voicing factor, said excitation energy, and said tilt scaling factor.

21. A cellular communication system as defined in claim 20, wherein said voicing factor generator comprises a means for calculating said voicing factor in relation to an energy of a gain-scaled version of the pitch codevector and an energy of a gain-scaled version of the innovative codevector.

22. A cellular communication system as defined in claim 20, wherein said gain adjustment module comprises a means for calculating an energy scaling factor in relation to the white noise sequence and an enhanced excitation signal derived from said excitation signal.

23. A cellular communication system as defined in claim 20, wherein said spectral tilt calculator comprises a means for calculating said tilt scaling factor in relation to the synthesized signal and the voicing factor, N is a subframe length and n=0, . . . N−1.

24. A cellular communication system as defined in claim 19, wherein said band-pass filter comprises a frequency bandwidth located between 5.6 kHz and 7.2 kHz.

25. A mobile transmitter/receiver unit comprising:

a receiver including a receiving circuit for receiving a transmitted encoded wideband signal and a decoder for decoding the received encoded wideband signal, said decoder comprising:

i) a signal fragmenting device for receiving an encoded version of a wideband signal previously down-sampled during encoding and extracting from said encoded wideband signal version at least pitch codebook parameters, innovative codebook parameters, and linear prediction filter coefficients;

ii) a pitch codebook responsive to said pitch codebook parameters for producing a pitch codevector;

iii) an innovative codebook responsive to said innovative codebook parameters for producing an innovative codevector;

iv) a combiner circuit for combining said pitch codevector and said innovative codevector to thereby produce an excitation signal;

v) a signal synthesis device including a linear prediction filter for filtering said excitation signal in relation to said linear prediction filter coefficients to thereby produce a synthesized wideband signal, and an oversampler responsive to said synthesized wideband signal for producing an over-sampled signal version of the synthesized wideband signal; and vi) a high-frequency content recovering device comprising:

(1) a random noise generator for producing a noise sequence having a given spectrum;

(2) a spectral shaping unit for shaping the spectrum of the noise sequence in relation to linear prediction filter coefficients related to said down-sampled wideband signal; and (3) a signal injection circuit for injecting said spectrally-shaped noise sequence in said over-sampled synthesized signal version to thereby produce said full-spectrum synthesized wideband signal.

26. A mobile transmitter/receiver unit as defined in claim 25, wherein said random noise generator comprises a random white noise generator for producing a white noise sequence whereby said spectral shaping unit produces a spectrally-shaped white noise sequence.

27. A mobile transmitter/receiver unit as defined in claim 26, wherein said spectral shaping unit comprises:

a) a gain adjustment module, responsive to said white noise sequence and a set of gain adjusting parameters, for producing a scaled white noise sequence;

b) a spectral shaper for filtering said scaled white noise sequence in relation to a bandwidth expanded version of the linear prediction filter coefficients to produce a filtered scaled white noise sequence characterized by a frequency bandwidth generally higher than a frequency bandwidth of said over-sampled synthesized signal version; and c) a band-pass filter responsive to said filtered scaled white noise sequence for producing a band-pass filtered scaled white noise sequence to be subsequently injected in said over-sampled synthesized signal version as said spectrally-shaped white noise sequence.

28. A mobile transmitter/receiver unit as defined in claim 27, further comprising:

a) a voicing factor generator responsive to said pitch and innovative codevectors for calculating a voicing factor for forwarding to said gain adjustment module;

b) an energy computing module responsive to said excitation signal for calculating an excitation energy for forwarding to said gain adjustment module; and c) a spectral tilt calculator responsive to said synthesized signal for calculating a tilt scaling factor for forwarding to said gain adjustment module;

wherein said set of gain adjusting parameters comprises said voicing factor, said excitation energy, and said tilt scaling factor.

29. A mobile transmitter/receiver unit as defined in claim 28, wherein said voicing factor generator comprises a means for calculating said voicing factor in relation to an energy of a gain-scaled version of the pitch codevector and an energy of a gain-scaled version of the innovative codevector.

30. A mobile transmitter/receiver unit as defined in claim 28, wherein said gain adjustment module comprises a means for calculating an energy scaling factor in relation to the white noise sequence and an enhanced excitation signal derived from said excitation signal.

31. A mobile transmitter/receiver unit as defined in claim 28, wherein said spectral tilt calculator comprises a means for calculating said tilt scaling factor in relation to the synthesized signal and the voicing factor.

32. A mobile transmitter/receiver unit as defined in claim 27, wherein said band-pass filter comprises a frequency bandwidth located between 5.6 kHz and 7.2 kHz.

33. A communication network element comprising:

a receiver including a receiving circuit for receiving a transmitted encoded wideband signal and a decoder as recited in claim 1 for decoding the received encoded wideband signal.

34. A communication network element as defined in claim 33, wherein said random noise generator comprises a random white noise generator for producing a white noise sequence whereby said spectral shaping unit produces a spectrally-shaped white noise sequence.

35. A communication network element as defined in claim 34, wherein said spectral shaping unit comprises:

a) a gain adjustment module, responsive to said white noise sequence and a set of gain adjusting parameters, for producing a scaled white noise sequence;

b) a spectral shaper for filtering said scaled white noise sequence in relation to a bandwidth expanded version of the linear prediction filter coefficients to produce a filtered scaled white noise sequence characterized by a frequency bandwidth generally higher than a frequency bandwidth of said over-sampled synthesized signal version; and c) a band-pass filter responsive to said filtered scaled white noise sequence for producing a band-pass filtered scaled white noise sequence to be subsequently injected in said over-sampled synthesized signal version as said spectrally-shaped white noise sequence.

36. A communication network element as defined in claim 35, further comprising:

a) a voicing factor generator responsive to said pitch and innovative codevectors for calculating a voicing factor for forwarding to said gain adjustment module;

b) an energy computing module responsive to said excitation signal for calculating an excitation energy for forwarding to said gain adjustment module; and c) a spectral tilt calculator responsive to said synthesized signal for calculating a tilt scaling factor for forwarding to said gain adjustment module;

wherein said set of gain adjusting parameters comprises said voicing factor, said excitation energy, and said tilt scaling factor.

37. A communication network element as defined in claim 36, wherein said voicing factor generator comprises a means for calculating said voicing factor in relation to an energy of a gain-scaled version of the pitch codevector and an energy of a gain-scaled version of the innovative codevector.

38. A communication network element as defined in claim 36, wherein said gain adjustment module comprises a means for calculating an energy scaling factor the white noise sequence and an enhanced excitation signal derived from said excitation signal.

39. A communication network element as defined in claim 36, wherein said spectral tilt calculator comprises a means for calculating said tilt scaling factor in relation to the synthesized signal and the voicing factor.

40. A communication network element as defined in claim 35, wherein said band-pass filter comprises a frequency bandwidth located between 5.6 kHz and 7.2 kHz.

41. In a cellular communication system for servicing a geographical area divided into a plurality of cells, comprising: mobile transmitter/receiver units; cellular base stations, respectively situated in said cells; and a control terminal for controlling communication between the cellular base stations:

a bidirectional wireless communication sub-system between each mobile unit situated in one cell and the cellular base station of said one cell, said bidirectional wireless communication sub-system comprising, in both the mobile unit and the cellular base station:

a) a transmitter including an encoder for encoding a wideband signal and a transmission circuit for transmitting the encoded wideband signal; and b) a receiver including a receiving circuit for receiving a transmitted encoded wideband signal and a decoder as recited in claim 1 for decoding the received encoded wideband signal.

42. A bidirectional wireless communication sub-system as defined in claim 41, wherein said random noise generator comprises a random white noise generator for producing a white noise sequence whereby said spectral shaping unit produces a spectrally-shaped white noise sequence.

43. A bidirectional wireless communication sub-system as defined in claim 42, wherein said spectral shaping unit comprises:

a) a gain adjustment module, responsive to said white noise sequence and a set of gain adjusting parameters, for producing a scaled white noise sequence;

b) a spectral shaper for filtering said scaled white noise sequence in relation to a bandwidth expanded version of the linear prediction filter coefficients to produce a filtered scaled white noise sequence characterized by a frequency bandwidth generally higher than a frequency bandwidth of said over-sampled synthesized signal version; and c) a band-pass filter responsive to said filtered scaled white noise sequence for producing a band-pass filtered scaled white noise sequence to be subsequently injected in said over-sampled synthesized signal version as said spectrally-shaped white noise sequence.

44. A bidirectional wireless communication sub-system as defined in claim 43, further comprising:

a) a voicing factor generator responsive to said pitch and innovative codevectors for calculating a voicing factor for forwarding to said gain adjustment module;

b) an energy computing module responsive to said excitation signal for calculating an excitation energy for forwarding to said gain adjustment module; and c) a spectral tilt calculator responsive to said synthesized signal for calculating a tilt scaling factor for forwarding to said gain adjustment module;

wherein said set of gain adjusting parameters comprises said voicing factor, said excitation energy, and said tilt scaling factor.

45. A bidirectional wireless communication sub-system as defined in claim 44, wherein said voicing factor generator comprises a means for calculating said voicing factor in relation to an energy of a gain-scaled version of the pitch codevector and an energy of a gain-scaled version of the innovative codevector.

46. A bidirectional wireless communication sub-system as defined in claim 44, wherein said gain adjustment module comprises a means for calculating an energy scaling factor in relation to the white noise sequence and an enhanced excitation signal derived from said excitation signal.

47. A bidirectional wireless communication sub-system as defined in claim 44, wherein said spectral tilt calculator comprises a means for calculating said tilt scaling factor in relation to the synthesized signal and the voicing factor.

48. A bidirectional wireless communication sub-system as defined in claim 43, wherein said band-pass filter comprises a frequency bandwidth located between 5.6 kHz and 7.2 kHz.

49. A decoder for producing a synthesized wideband signal as defined in claim 1, wherein said spectral shaping unit comprises a spectral shaper for filtering the noise sequence in relation to a bandwidth expanded version of the linear prediction filter coefficients to produce a filtered noise sequence characterized by a frequency bandwidth generally higher than a frequency bandwidth of the over-sampled synthesized signal version.

50. A decoder for producing a synthesized wideband signal as defined in claim 9, wherein said spectral shaping unit comprises a spectral shaper for filtering the noise sequence in relation to a bandwidth expanded version of the linear prediction filter coefficients to produce a filtered noise sequence characterized by a frequency bandwidth generally higher than a frequency bandwidth of the over-sampled synthesized signal version.

51. A cellular communication system as defined in claim 17, wherein said spectral shaping unit comprises a spectral shaper for filtering the noise sequence in relation to a bandwidth expanded version of the linear prediction filter coefficients to produce a filtered noise sequence characterized by a frequency bandwidth generally higher than a frequency bandwidth of the over-sampled synthesized signal version.

52. A mobile transmitter/receiver unit as defined in claim 25, wherein said spectral shaping unit comprises a spectral shaper for filtering the noise sequence in relation to a bandwidth expanded version of the linear prediction filter coefficients to produce a filtered noise sequence characterized by a frequency bandwidth generally higher than a frequency bandwidth of the over-sampled synthesized signal version.

53. A network element as defined in claim 33, wherein said spectral shaping unit comprises a spectral shaper for filtering the noise sequence in relation to a bandwidth expanded version of the linear prediction filter coefficients to produce a filtered noise sequence characterized by a frequency bandwidth generally higher than a frequency bandwidth of the over-sampled synthesized signal version.

54. A bidirectional wireless communication sub-system as defined in claim 41, wherein said spectral shaping unit comprises a spectral shaper for filtering the noise sequence in relation to a bandwidth expanded version of the linear prediction filter coefficients to produce a filtered noise sequence characterized by a frequency bandwidth generally higher than a frequency bandwidth of the over-sampled synthesized signal version.

* * * * *